J. CRAIK.
Bail and Driver for Millstones.
No. 196,336. Patented Oct. 23, 1877.
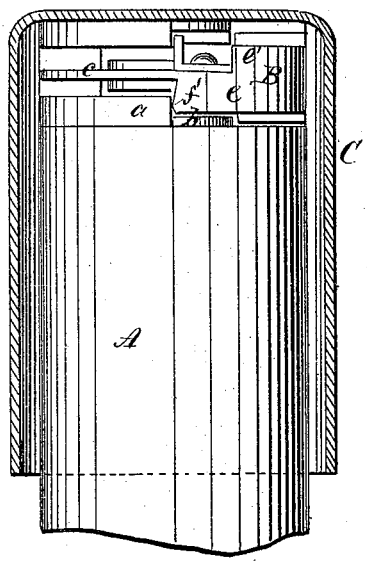
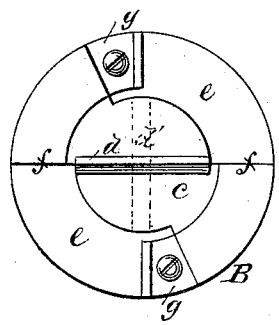
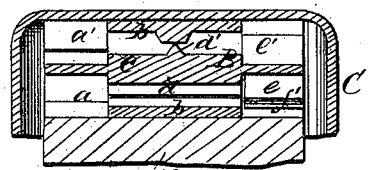
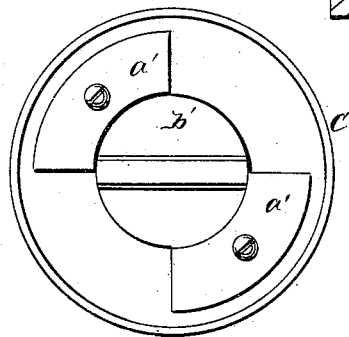
WITNESSES:
INVENTOR:
ATTORNEYS.

UNITED STATES PATENT OFFICE.

JAMES CRAIK, OF LA CROSSE, WISCONSIN.

IMPROVEMENT IN BAIL AND DRIVER FOR MILLSTONES.

Specification forming part of Letters Patent No. 196,336, dated October 23, 1877; application filed July 23, 1877.

*To all whom it may concern:*

Be it known that I, JAMES CRAIK, of La Crosse, in the county of La Crosse and State of Wisconsin, have invented a new and useful Improvement in Bail and Driver for Millstones, of which the following is a specification:

Figure 1 is a side elevation of my improved bail and driver, with a portion of the bail cut away to show the construction of the driving device. Fig. 2 is a central vertical section. Fig. 3 is an inverted plan view of the top of the bail. Fig. 4 is a detail view of the head that is driven by the spindle and carries the bail.

Similar letters of reference indicate corresponding parts.

The object of my invention is to provide a device for driving millstones, which will carry the stone with a positive motion, and which, at the same time, will permit the stone to poise itself with the utmost freedom on the top of the spindle.

In the drawings, A is a mill-spindle, having formed upon its upper end two arc-shaped lugs, $a$, having vertical sides and a central boss, $b$.

B is a carrier, consisting of the disk $c$, thickened at its center, and provided on opposite sides with two V-shaped ribs, $d\ d'$, arranged at right angles to each other. The lower rib, $d$, rests on the boss $b$, and lugs $e$ are formed on the lower surface of the disk, on opposite sides, each lug having a rounded edge, $f$, that rests against the vertical side of the lugs $a$, and is arranged directly in line with the rib $d$.

The inner surface of the top of the bail C is provided with lugs $a'$ and a boss, $b'$, similar to those upon the upper end of the spindle A. Upon the rib $d'$, which is arranged at right angles to the rib $d$, the boss of the bail C rests, and lugs $e'$ are formed on the upper side of the disk $c$, and are provided with the rounded edges $f'$, like those on the lugs $e$, which engage the lugs $a'$.

L-shaped plates $g$ are secured to the disk $c$ by screws, and are adjusted so that the lugs $a\ a'$ are included between them and the rounded edges $f\ f'$.

The millstone is supported by the bail C, and as it rests upon the V-shaped ribs $d\ d'$, it is capable of universal motion, so that it readily adjusts itself.

The rounded edges $f\ f'$ drive the bail. The lugs $e$ are carried by the lugs $a$ on the spindle, and the lugs $a'$ in the bail are carried by the lugs $e'$ on the disk.

The rounded edges $f\ f'$, being in line with the V-shaped ribs, permit the bail to move freely on its supports, even while being driven.

When the parts become worn the L-shaped plates $g$ are moved up against the lugs $a\ a'$.

Having thus described my invention, I claim as new and desire to secure by Letters Patent—

The disk $c$, having V-shaped ribs $d\ d'$ on opposite sides, arranged at right angles to each other, and having lugs $e\ e'$, with rounded edges $f\ f'$, in combination with the spindle A and bail C, having lugs $a\ a'$, substantially as shown and described.

JAMES CRAIK.

Witnesses:
JOHN WHELDON,
F. WOLF.